United States Patent
Turner et al.

(10) Patent No.: US 7,012,610 B2
(45) Date of Patent: Mar. 14, 2006

(54) PORTABLE DEVICE FOR PROVIDING DUAL DISPLAY AND METHOD THEREOF

(75) Inventors: Steven Turner, Kettleby (CA); Milivoje Aleksic, Richmond Hill (CA); Yin Wong Yang, Markham (CA); Charles Leung, North York (CA)

(73) Assignee: ATI Technologies, Inc., Thornhill (CA)

( * ) Notice: Subject to any disclaimer, the term of this patent is extended or adjusted under 35 U.S.C. 154(b) by 467 days.

(21) Appl. No.: 10/037,366

(22) Filed: Jan. 4, 2002

(65) Prior Publication Data

US 2003/0128197 A1 Jul. 10, 2003

(51) Int. Cl.
 *G06F 13/14* (2006.01)

(52) U.S. Cl. .......................... 345/519; 345/1.1; 345/3.1; 345/5; 345/520

(58) Field of Classification Search ......... 345/502–505, 345/520, 1.1, 3.1, 5, 519, 204, 2.1
See application file for complete search history.

(56) References Cited

U.S. PATENT DOCUMENTS

| | | | | | |
|---|---|---|---|---|---|
| 5,874,928 A | * | 2/1999 | Kou | .......................... | 345/1.1 |
| 6,075,513 A | * | 6/2000 | Reddy et al. | ............... | 345/589 |
| 6,118,413 A | * | 9/2000 | Bril et al. | .................... | 345/596 |
| 6,313,813 B1 | * | 11/2001 | Narui et al. | ................. | 345/3.2 |

* cited by examiner

*Primary Examiner*—Matthew C. Bella
*Assistant Examiner*—Hau Nguyen
(74) *Attorney, Agent, or Firm*—Toler, Larson & Abel, LLP (57) ABSTRACT

Systems and methods are provided for supporting an external display on a portable device. A system on a chip (SOC) of the portable device provides a first set of graphics data to a graphics controller. The embedded graphics controller renders the first set of graphics data for output using an LCD screen integrated with the portable device. The SOC renders a second set of graphics data and provides rendered graphics data to an external display interface. The external display interface formats the rendered graphics data for output on an external, remote display.

30 Claims, 4 Drawing Sheets

PORTABLE DEVICE FOR PROVIDING DUAL DISPLAY AND METHOD THEREOF

FIELD OF THE DISCLOSURE

The present invention relates generally to portable devices and more specifically to portable device display output.

BACKGROUND

Portable devices are being designed for supporting high quality video playback. High quality video playback on portable devices is in high demand. Devices such as personal digital assistants and web-browsing cellular telephones are being used for accessing and playing back video files. Graphics controllers are being integrated into portable devices, such as personal digital assistants (PDAs) and web-capable mobile phones, for decoding and playing video data, such as Motion Pictures Experts Group (MPEG) video data. The graphics controllers are capable of providing full motion video playback on the displays generally integrated within the portable devices.

Support for remote displays, external to the portable device, is also in demand. Portable devices with support for remote displays can be used to provide a slide presentation on a projector or computer screen. Two graphics controllers are generally used, a first graphics controller for video playback and a second graphics controller for a remote display. Additional memory is generally needed to support both graphics controllers.

Using multiple decoders for supporting video playback and an external display is expensive to integrate into a portable device. The additional components for supporting both video playback and an external display take up space within the portable device; however, space within the potable device is limited due to requirements to keep the device portable. Portable devices are generally desired to consume as little power as necessary; however, the additional components integrated within the device consume additional power and reduce the amount of time the portable device can last on a single set of power cells.

From the above discussion, it is apparent that an improved method of providing video support and external display support is needed.

BRIEF DESCRIPTION OF THE DRAWINGS

Specific embodiments of the present disclosure are shown and described in the drawings presented herein. Various objects, advantages, features and characteristics of the present disclosure, as well as methods, operations and functions of related elements of structure, and the combination of parts and economies of manufacture, will become apparent upon consideration of the following description and claims with reference to the accompanying drawings, all of which form apart of this specification, and wherein:

DETAILED DESCRIPTION OF THE FIGURES

At least one embodiment of the present invention provides for a method of supporting video associated with a portable device on an integrated display and video on a remote display. The method includes receiving a first and second set of graphics data in a system on a chip (SOC) embedded in the portable device. In one embodiment, the first and second sets of graphics data include non-rendered graphics data. The method includes providing the first set of graphics data to a graphics controller, external to the SOC. The graphics controller processes the first set of graphics data into a first set of rendered graphics data that can be provided to an integrated display, integrated with the portable device. The method further includes processing, within the SOC, the second set of graphics data into a second set of rendered graphics data. The second set of rendered graphics data is then provided to a display interface. The display interface formats the second set of rendered graphics data into a particular display format associated with a remote display. The formatted rendered graphics, data is then output to the remote display.

Figure 1:
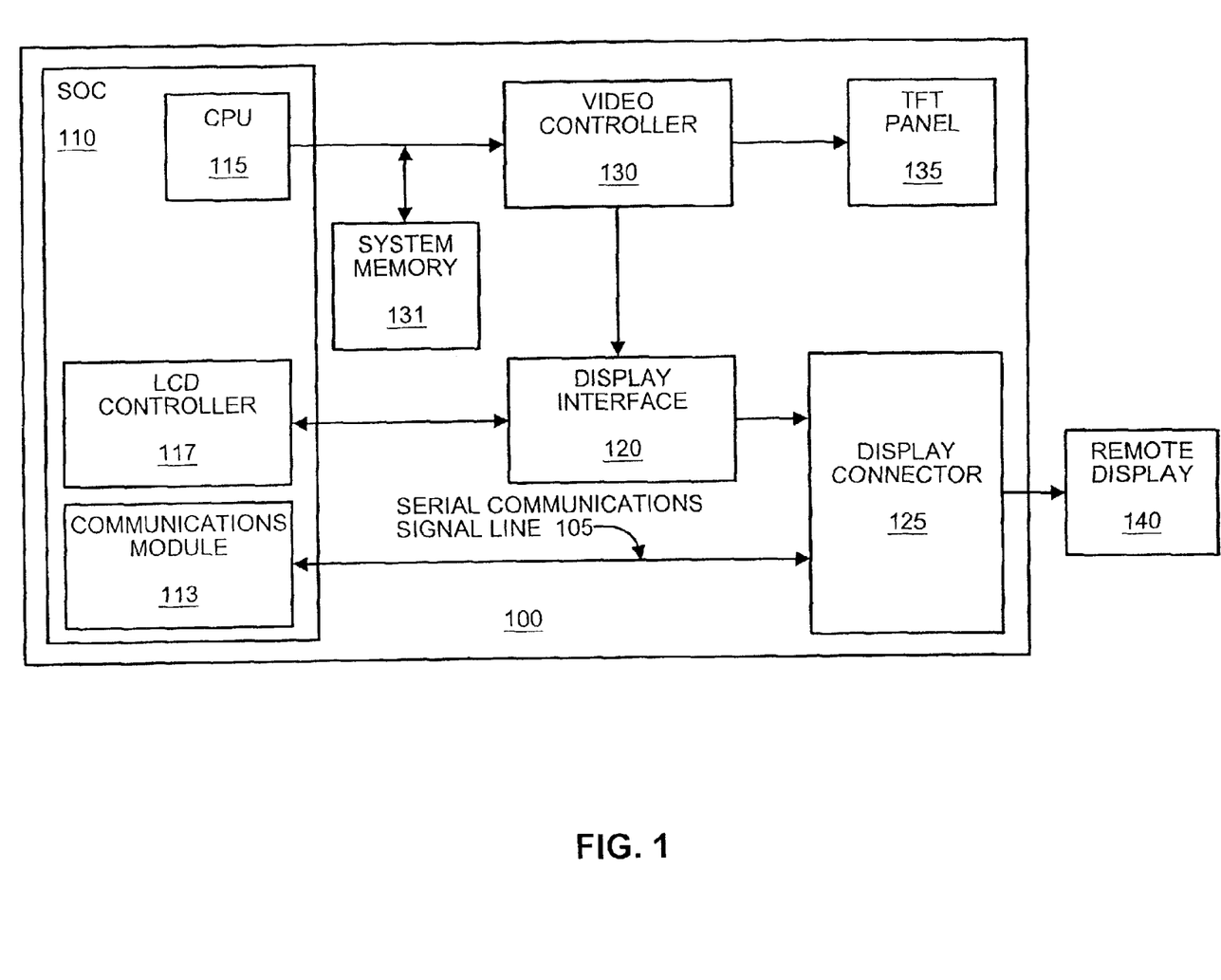
FIG. 1 is a block diagram illustrating a system for providing a first set of video to an integrated display and a second set of video to a remote display, according to one embodiment of the present invention.

Referring now to FIG. 1, a block diagram illustrating a system for supporting video display on an integrated display and a remote display and is shown and generally referenced as system 100, according to one embodiment of the present invention. In one embodiment, system 100 is a portable device, such as a PDA. System 100 includes a system on a chip (SOC) 110, a video controller 130 coupled with a thin film transistor (TFT) panel 135, and a display interface 120 interfaced with remote display 140. Video controller 130 renders a first set of graphics data for TFT panel 135 and a liquid crystal display (LCD) controller 117 of SOC 110 renders a second set of graphics data, which is displayed on remote display 140.

SOC 110 includes a central processing unit (CPU) 115, an embedded LCD controller 117, and a communications module 113. CPU 115 is used to run applications from system memory 131 of system 100. CPU 115 receives various graphics requests for displaying graphics data on TFT panel 135 or remote display 140. For example, CPU 115 can receive a first set of graphics data associated with a running slide presentation application (not shown). The first set of graphics data can include a list of available slides. CPU 115 can provide the first set of graphics data to video controller 130, for display on TFT panel 135. CPU 115 can also receive a second set of graphics data used to show a slide selected from the available slides in more detail. The CPU 115 provides the second set of graphics data to embedded LCD controller 117, for display on remote display 140. In one embodiment, CPU 115 accesses the graphics requests and the first and second sets of graphics data from system memory 131.

In one embodiment, a video driver (not shown), run using CPU 115, is used to decode whether graphics data is to be displayed on an integrated display, such as TFT panel 135, or on a display external to system 100, such as remote display 140. For example, in one embodiment, TFT panel 135 can be used for video playback. For example, a full motion MPEG video file may be displayed on TFT panel 135 while remote display 140 displays a screen for selecting applications. CPU 110 may target particular components, such as video controller 130 or embedded LCD controller 117 by placing an address header with the data indicating the particular component and placing the data on a communications bus.

An embedded graphics controller, LCD controller 117, renders graphics data, such as the second set of graphics data provided through the CPU 115. In one embodiment, embedded LCD controller 117 renders the graphics data in a format suitable for an LCD display, such as TFT panel 135. To display graphics data rendered from the LCD controller 117, the rendered graphics data is provided to display interface 120. In one embodiment, embedded LCD controller 117 accessed the graphics data from memory (not shown).

A communications module 113 of SOC 110 is used for communicating with a display, such as remote display 140, external to system 100. In one embodiment, the communication module 113 uses digital video interface (DVI) protocol for determining a type of display associated with remote display 140. For example, in one embodiment, communication module provides a DVI query for a display type onto a serial communications signal line 105. The serial communications signal line 105 is coupled to DVI communications lines of display connector 125. Display connector 125 can include several different display connectors for supporting a plurality of displays. The display type is provided to video controller 130. In one embodiment, the communication module 113 communicates with the remote display 140, through display connector 125, using I2S communications protocols. It should be noted that other forms of communicating between the communication module 113 and the remote device 140 can be used without departing from the scope of the present disclosure. In an alternate embodiment, a user provides a type of display for remote display 140. For example, the user can assign a display type setting using the display driver. The SOC 110 can then provide a command to video controller 130 indicating a display type associated with remote display 140.

A graphics controller external to SOC 110, video controller 130, renders graphics data for TFT panel 135. In one embodiment, video controller 130 is capable of direct memory access (DMA) from system memory 131. Accordingly, video controller 130 can access graphics data from system memory 131. Alternatively, video controller 130 can receive graphics data through CPU 115. In one embodiment, video controller 130 processes the graphics data for display on TFT panel 135. Accordingly, the video controller 130 provides rendered graphics data to TFT panel 135. TFT panel 135 includes a screen integrated with a portable device, such as system 100. In one embodiment, video controller 130 includes a graphics controller embedded with respect to system 100 and external to SOC 110.

Display interface 120 receives rendered graphics data generated by embedded LCD controller 117. In one embodiment, the rendered graphics data generated by embedded LCD controller 117 is formatted for an LCD display, different from remote display 140. Accordingly, display interface 120 formats the rendered graphics data into a format associated with remote display 140. Display interface 120 can receive control data from video controller 130 indicating a display format or display type associated with remote display 140. Accordingly, display interface 120 can transform the rendered graphics data generated by embedded LCD controller 117 into a display format and/or display type associated with remote display 140. The transformed graphics data generated by display interface 120 can then be provided to remote display 140, through a display connector 125. In one embodiment, video controller 130 receives control data provided by SOC 110. For example, SOC 110 can send control data indicating a type of display associated with remote display 140. Accordingly, video controller 130 can use the control data to assert a display type or display format in display interface 120. In an alternate embodiment, video controller 130 accesses the control data directly through system memory 131.

In one embodiment, display connector 125 represents one or more interfaces for use with several display types. For example, display connector 125 can include a VGA interface for connecting a VGA display as well as an LVDS interface for connecting with a digital display or projector. Other types of connection interfaces can be used in place of or in addition to display connector 125, such as a TMDS interface, without departing from the scope of the present invention. In one embodiment, output from the display interface 120 is disabled after a period of inactivity in system 100. Accordingly, power used by system 100 can be conserved.

It should be noted that conventional systems supporting remote displays, such as remote display 140, do not generally use embedded LCD controller 117 to render graphics data. Instead, an additional graphics controller, external to SOC 110, is generally added to the portable device to render graphics data to the remote display. Accordingly, the present invention has the advantage of reducing an amount of added hardware to support the remote display by using the embedded LCD controller 117, embedded in the SOC 110, to render graphics data and simply formatting the graphics data for the remote display 140 using display interface 120.

Figure 2:
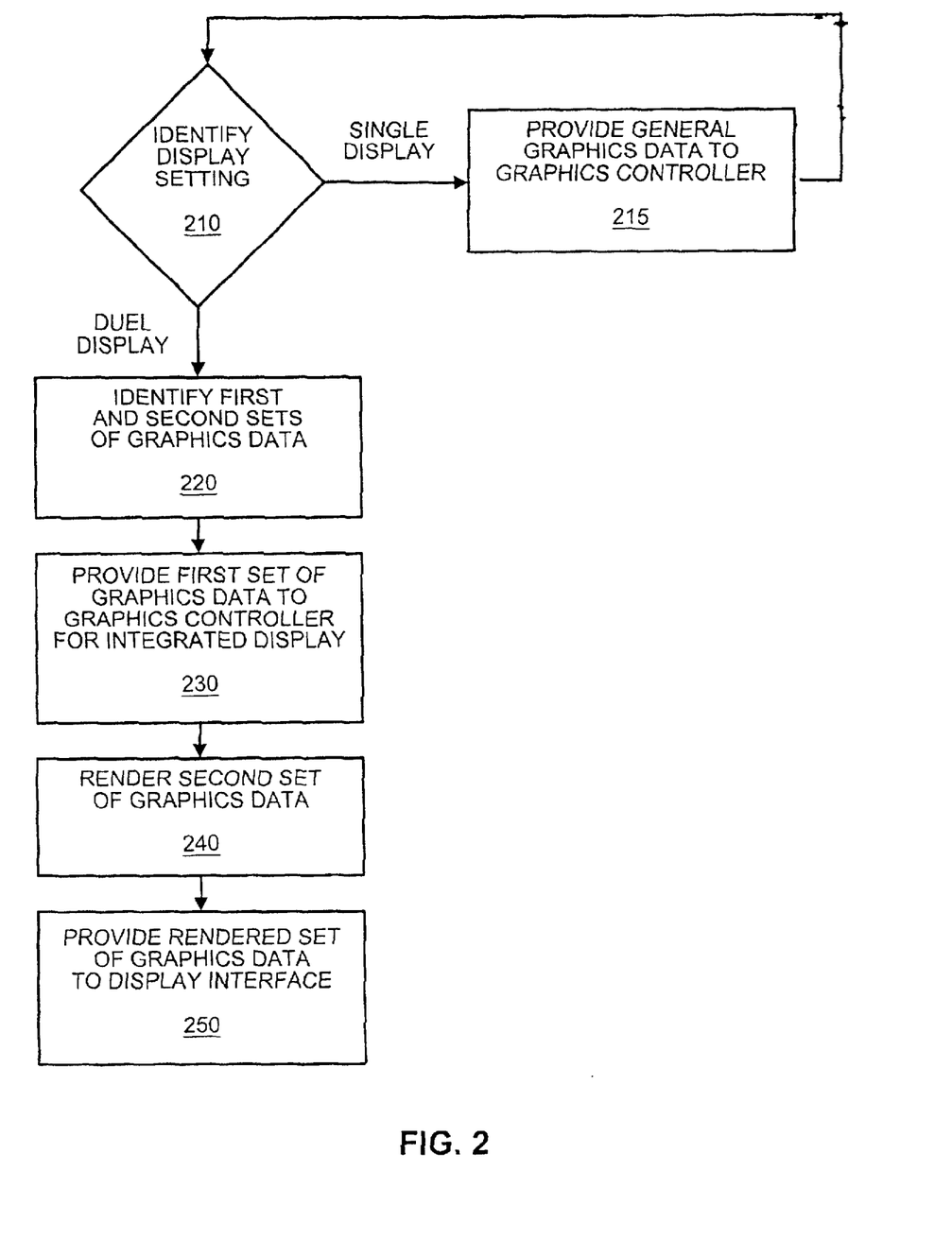
FIG. 2 is a flow diagram illustrating a method of providing graphics data associated with a portable device, according to one embodiment of the present invention.

Referring now to FIG. 2, a flow diagram illustrating a method of generating a first and a second set of rendered graphics data is shown, according to one embodiment of the present invention. In step 210, an SOC, such as SOC 110 (FIG. 1), identifies a current display setting. The SOC identifies whether a portable device associated with the SOC is in a single display or a dual display configuration. The setting can be based on a number of available displays. For example, if a remote display connected to the portable device is found in addition to an integrated display associated with the portable device, the SOC can enable a dual display configuration. If only the integrated display is available, the SOC enables a single display configuration. Alternatively, the display settings can be user based. In step 215, if the SOC identifies a single display configuration, a set of general graphics data is provided to a video controller, external to the SOC. In one embodiment, the video controller is capable of providing video decoding support. The general graphics data provides system display data. For example, the general graphics data can include a main window associated with an application or operating system, allowing a user to have access to system information, such as system control information.

In step 220, if a dual display configuration is identified, the SOC identifies a first and a second set of graphics data. In one embodiment, the first set of graphics data includes general system control graphics data. Alternatively, the second set of graphics data can provide supplementary display information. For example, in a slideshow application, the first set of graphics data can include a window identifying different slide available. In comparison, the second set of graphics data can be used to display a currently selected slide. In an alternate embodiment, the first set of graphics data includes the same graphics information as the second set of graphics data.

In step 230, the first set of graphics data is provided to the video controller, external to the SOC. In one embodiment, the video controller is used to render the first set of graphics data and provide the rendered graphics data to the integrated display. In step 240, the SOC uses an embedded graphics controller, internal to the SOC, to render the second set of graphics data. In one embodiment, an LCD controller, internal to the SOC, renders the second set of graphics data in an LCD display format. In step 250, the SOC provides the rendered graphics data, associated with the second set of graphics data, to a display interface. In one embodiment, the display interface is used to format the rendered graphics data into a display format supported by a remote display connected to the portable device.

Figure 3:
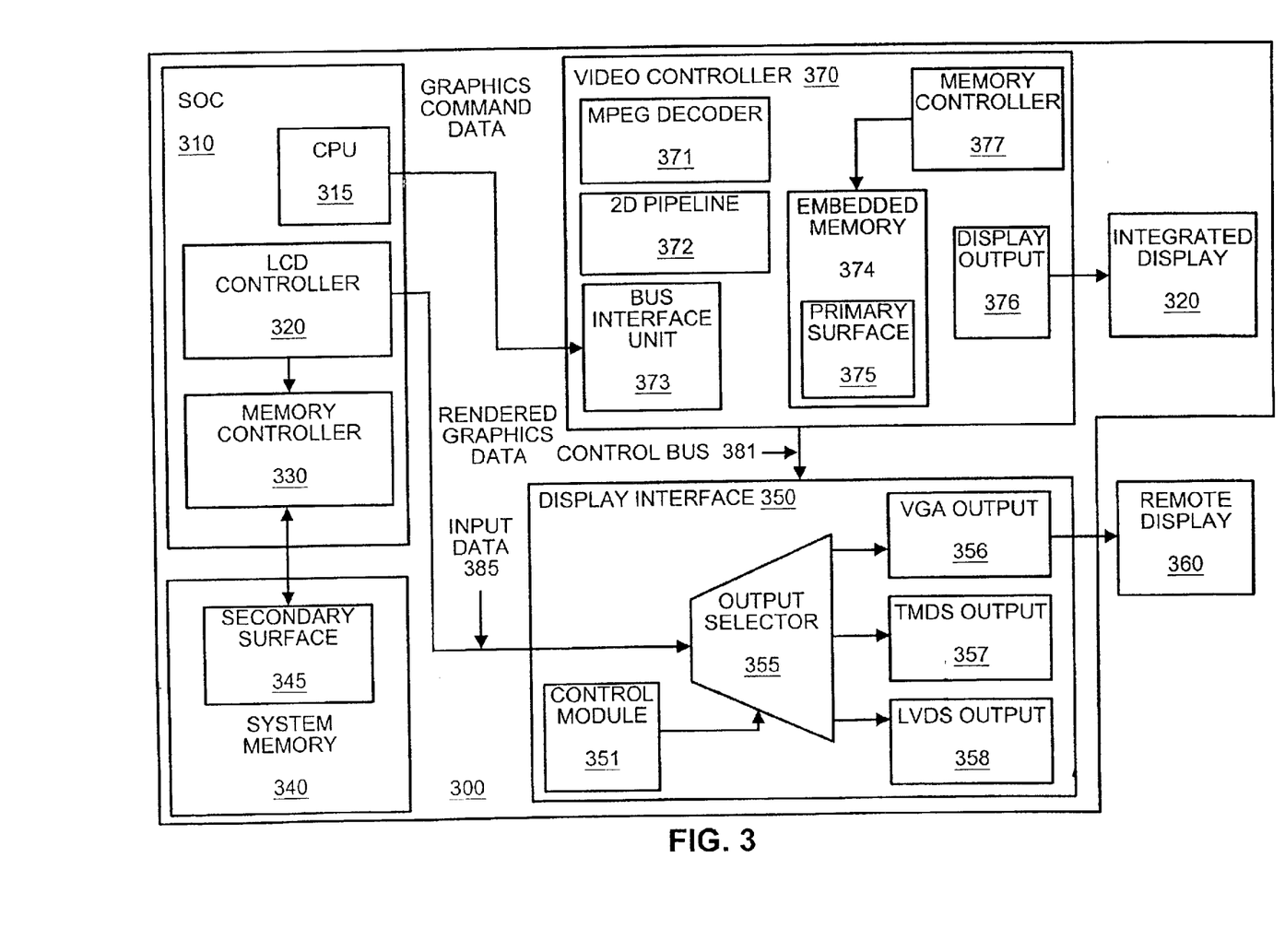
FIG. 3 is a block diagram illustrating a system for supporting an integrated display and a remote display device, according to one embodiment of the present invention.

Referring now to FIG. 3, a block diagram illustrating a system for supporting an integrated display and a remote display within a portable device is shown, and generally referenced as system 300. In on embodiment, system 300 includes a portable device, such as a PDA. An embedded system on a chip, SOC 310, receives video data from an application being run using the SOC. A first set of video data is provided to an embedded graphics controller, video controller 370, for display on an integrated display 380. A second set of video data is provided to LCD controller 320 for display on a remote display 360, through a display interface 350.

SOC 310 operates similar to SOC 110 (FIG. 1). A CPU 315 processes data associated with applications generally stored in system memory 340. CPU 315 directs a first set of graphics data to video controller 370, external to the SOC 310. Video controller 370 generates a first set of rendered graphics data. LCD controller 320, internal to SOC 310, renders a second set of graphics data. LCD controller 320 processes the second set of graphics data into a second set of rendered graphics data. In one embodiment, LCD controller 320 stores the second set of rendered graphics data in system memory 340, using memory controller 330. A second surface 315 is used to store the second set of rendered graphics data within system memory 340. A memory controller 330 provides access of system memory 340 for LCD controller 320. In one embodiment, SOC 310 communicates with remote display 360 and provides display settings associated with remote display 360 to video controller 370.

In one embodiment, video controller 370 includes a graphics controller embedded with respect to system 300 but external to SOC 310. Video controller 370 receives graphics data and command data from SOC 310 through a bus interface unit 373. In one embodiment, video controller 370 renders the first set of graphics data from CPU 315 into a format associated with an integrated display 320. An MPEG decoder 371 processes MPEG data received from SOC 310 into display data. Similarly a two dimensional (2D) pipeline 372 generates rendered graphics data from the first set of graphics data provided by the SOC 310.

A memory controller 377 provides access to embedded memory 374. Embedded memory 374 stores a primary surface 375, used to store rendered graphics data to be displayed on integrated display 380. Rendered graphics data provided through components of video controller 370, such as through MPEG decoder 371 and 2D pipeline 372, are stored in primary surface 375 of embedded memory 374. A display output 376 provides rendered graphics data stored in primary surface 375 to an integrated display 380. In one embodiment, integrated display 380 includes an LCD display integrated with a portable device, such as system 300. It should be appreciated that video controller 370 can include other components not described without departing from the scope of the present invention.

In one embodiment, video controller 370 receives display settings associated with remote display 360 from SOC 310. Video controller 370 provides control data associated with the display settings to display interface 350 via a control bus 381. In one embodiment, the control bus 381 includes a general purpose input/output (GPIO) interface between the video controller 370 and the display interface 350. It should be appreciated that other forms of communication interfaces can be used without departing from the scope of the present invention. For example, control bus 381 can include a proprietary communications bus. In addition, SOC 310 can also communicate with display interface 350 to identify a type of remote display being used, such as remote display 360.

In one embodiment, system 300 also includes an embedded display interface, display interface 350, external to SOC 310. Display interface 350 formats and outputs rendered graphics data for a remote display 360. In one embodiment, display interface 350 receives the rendered graphics data from secondary surface 315, stored in system memory 340, via an input data bus 385. The input data bus 385 can include a communications bus between the SOC 310 and the display interface 350. In one embodiment, the input data bus 385 includes separate lines for a pixel clock, a vertical synchronization signal, a horizontal synchronization signal, and a display enable signal. Furthermore, the input data line 385 can include separate sets of lines to provide read, green and blue display data. Display interface 350 formats the rendered graphics data received through input data bus 385 into a plurality of display formats using a VGA output 356, a TMDS output 357 or an LVDS output 358. In one embodiment, an output selector 355 provides the rendered graphics data to one of the display outputs 356–358.

Each of the display outputs 356–358 can be used to format the rendered graphics data into an appropriate form. For example, the VGA output 356 can include a digital to analog (DAC) converter to provide analog video associated with received display data. Similarly, the TMDS output 357 and the LVDS output 358 can include a TMDS transmitter and an LVDS transmitter, respectively. The outputs 356–358 can be coupled to a multiple display interface (not shown). The multiple display interface can provide outputs for a plurality of supported displays. For example, the multiple display interface can provide a connection for a VGA display, TMDS display and an LVDS display.

A control module 351 processes the control data provided by video controller 370. The control module decides which of the outputs 356–358 will be used based on display data provided by the video controller 370. For example, if the display data indicates remote display 360 is associated with a VGA display, control module 351 determines VGA output 356 will be an active output for the rendered graphics data. Control module 351 can provide control of output selector 255 to select the output matching remote display 360. In one embodiment, control module 351 also provides control of output display settings, such as refresh rate and resolution, to output selector 355 and/or outputs 356–358 to match desired user settings. As previously discussed, a user can make desired output settings through the use of an application or display driver run through CPU 315. The desired output settings can then be provided to display interface 350, through video controller 370. Alternatively, display settings can be made based on a detected display type through communication with remote display 360, such as through a DVI interface.

Figure 4:
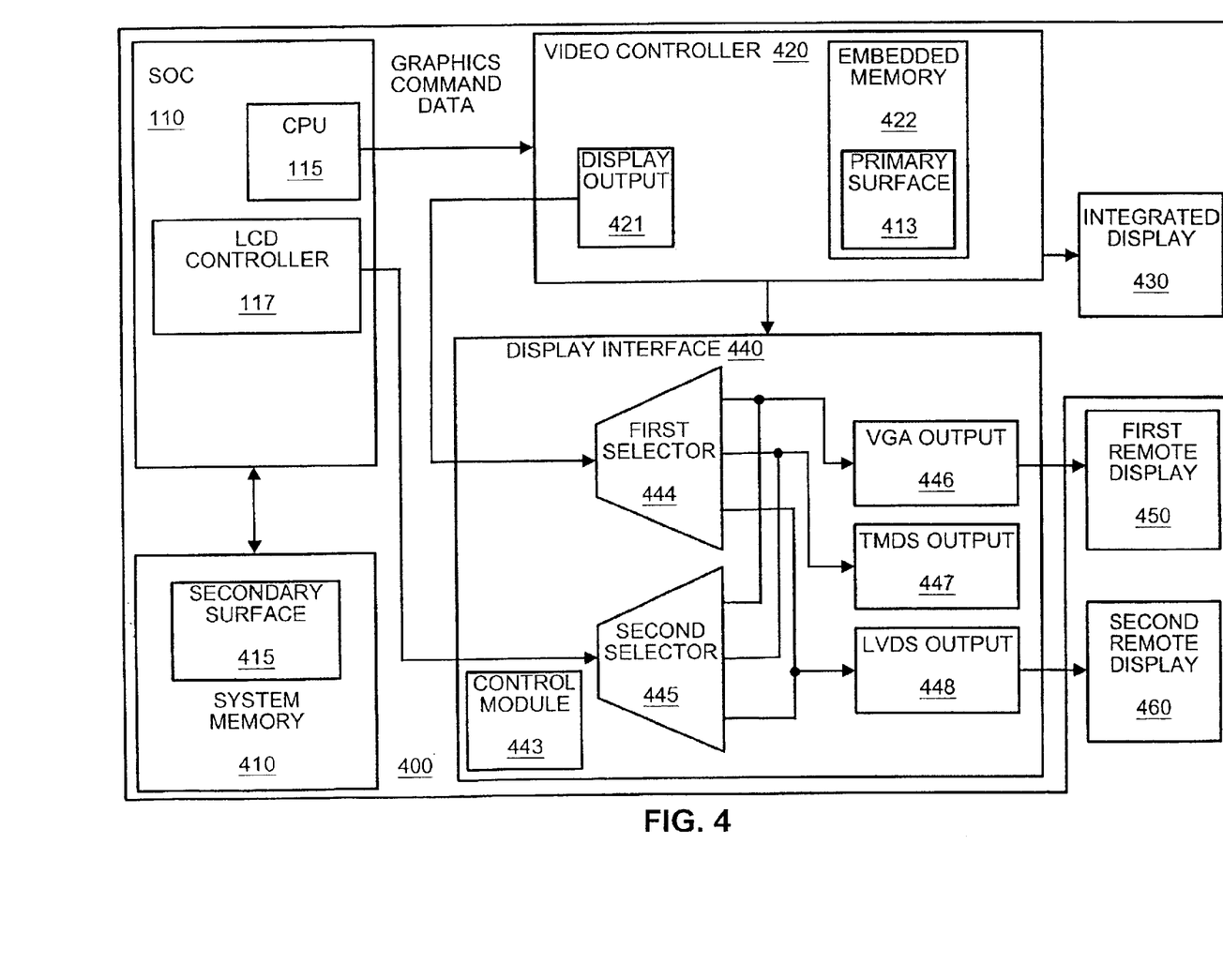
FIG. 4 is a block diagram illustrating a system for supporting a plurality of remote displays, according to one embodiment of the present invention.

Referring now to FIG. 4, a block diagram illustrating a system for supporting a plurality of remote displays is shown and generally referenced as system 400, according to one embodiment of the present invention. System 400 includes a portable device capable of using a plurality of external, or remote, displays. A first set of graphics data is rendered by a video controller 420 and displayed on first remote display 450. A second set of graphics data is rendered by an embedded LCD controller 117 and displayed on a second remote display 460.

CPU 115 of SOC 110 receives sets of graphics data generated by applications associated with system 400. CPU 115 provides a first set of graphics data to video controller 420 and a second set of graphics data to embedded LCD controller 117. The first set of graphics data is rendered by video controller 420 into a first set of rendered graphics data and stores the first set of rendered graphics data as a primary surface 413 in embedded memory 422. Similarly, embedded LCD controller 117 renders the second set of graphics data into a second set of rendered graphics data and stores the second set of rendered graphics data as a secondary surface 415 in system memory 410.

In one embodiment, the first set of rendered graphics data, stored in primary surface 413, is provided to display interface 440. A first selector 444 of display interface 440 provides the first set of rendered graphics data to one of a plurality of supported outputs, a VGA output 446, a TMDS output 447, or an LVDS output 448. In one embodiment, the display outputs 446–448 format rendered graphics data into a format associated with a particular display. For example, the VGA output 446 can format the first set of rendered graphics data into a VGA display format. Once routed to a supported display output 446–448, can provide the first set of rendered graphics data to a first remote display 450. In one embodiment, display output 421 of video controller 420, further provides the first set of rendered graphics data to an integrated display 430 associated with system 400. Accordingly, the first set of rendered graphics data can be displayed on both the integrated display 430 and the first remote display 450.

In one embodiment, the second set of rendered graphics data, stored as secondary surface 415, is also provided to the display interface 440. A second selector 445 can provide the second set of rendered graphics data to one of the supported display outputs 446–448. Accordingly, the second selector 445 can provide the second set of rendered graphics data to the second remote display 460 using a display format supported by the second remote display 460.

A control module 443 can be used to apply particular display settings for display interface 440. For example, control module 443 can be used to determine which of the available display ports 446–448 are to be used for a particular set of rendered graphics data. Accordingly, the control module 443 can apply control to selectors 444 and 445 to route the particular set of rendered graphics data to a particular display port. For example, in the illustrated embodiment, the control module 443 communicates with first selector 444 to provide the first set of rendered graphics data, from the video controller 420, to VGA output 446 for first remote display 450. Similarly, the control module 443 communicates with the second selector 445 to route the second set of rendered graphics data, from the embedded LCD controller 117, to the LVDS output 448 for the second remote display 460.

In one embodiment, the control module 443 is operated by user-controlled settings. A user selects which of the outputs are to be used for which set of rendered graphics data. The user settings are provided to the video controller 420 as command data and the video controller 420 provides a control signal to the control module 443 indicating desired settings. Alternatively, the control module 443 may detect appropriate settings. For example, control module 443 can detect the presence of a display, such as first remote display 450, connected to a particular output, such as VGA output 446. Similarly, display types and settings can be received from a connected display, such as with DVI protocol. Control module 443 may also apply settings to display outputs 446–448 to adjust display format settings. For example, control module 443 may adjust a refresh rate or resolution used by a particular display output 446–448.

In one embodiment, a particular set of rendered graphics data is provided to multiple display outputs. For example, the second set of rendered graphics data can be provided to both the TMDS output 447 and the LVDS output 448. However, it should be noted, that a single display output should not be used for more than one particular set of rendered graphics data at one time. For example, if the first set of rendered graphics data is being provided to the VGA output 446, the second set of rendered graphics data should not be provided to the VGA output 446. Accordingly, it may be necessary to provide a priority to particular sets of rendered graphics data and particular outputs. For example, if VGA display is detected connected to the VGA output 446, the first rendered graphics data will be routed to VGA output 446. Alternatively, user settings can dictate which set of rendered graphics data is provided to which display output 446–448.

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices. It should be appreciated that the system described herein has the advantage of dynamically reducing power consumption in response to system activity.

In the preceding detailed description of the embodiments, reference has been made to the accompanying drawings which form a part thereof, and in which is shown by way of illustration specific embodiments in which the disclosure may be practiced. These embodiments are described in sufficient detail to enable those skilled in the art to practice the disclosure, and it is to be understood that other embodiments may be utilized and that logical, mechanical, and electrical changes may be made without departing from the spirit or scope of the disclosure. To avoid detail not necessary to enable those skilled in the art to practice the disclosure, the description may omit certain information known to those skilled in the art. Furthermore, many other varied embodiments that incorporate the teachings of the disclosure may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A portable device comprising:
   an embedded system on a chip having a first interface and a second interface;

an embedded graphics controller to generate a first rendered graphics data to be displayed on an integrated display, said embedded graphics controller having a first interface coupled to the first interface of said embedded system on a chip and a second interface coupled to the integrated display;

an embedded display interface to format a second rendered graphics data for output to a first remote display, said embedded display interface having at least a first input coupled to the second interface of said embedded system on a chip; and wherein the embedded system on a chip includes a display controller used to generate said second rendered graphics data and to provide said second rendered graphics data to said embedded display interface.

2. The portable device as in claim 1, wherein:

said system on a chip provides non-rendered graphics data to said embedded graphics controller; and said embedded graphics controller generates said first rendered graphics data from said non-rendered graphics data.

3. The portable device as in claim 1, wherein said embedded graphics controller generates control signals used to control functionality associated with said embedded display interface.

4. The portable device as in claim 1, wherein said integrated display includes a liquid crystal display.

5. The portable device as in claim 1, wherein said embedded graphics display interface is coupled to said remote display.

6. The portable device as in claim 1, wherein said embedded graphics display interface further includes a Video Graphics Adapter output interface.

7. The portable device as in claim 1, wherein said embedded graphics display interface further includes a Transition Minimized Differential Signaling output interface.

8. The portable device as in claim 1, wherein said embedded graphics display interface further includes a Low Voltage Differential Signaling output interface.

9. The portable device as in claim 1, wherein said first rendered graphics data is different from said second rendered graphics data.

10. The portable device as in claim 1, wherein said embedded display interface is capable of being disabled to conserve power.

11. A portable device comprising:

an embedded system on a chip having a first interface and a second interface;

an embedded graphics controller to generate a first rendered graphics data to be displayed on an integrated display, said embedded graphics controller having a first interface coupled to the first interface of said embedded system on a chip and a second interface coupled to the integrated display;

an embedded display interface to format a second rendered graphics data for output to a first remote display, said embedded display interface having at least a first input coupled to the second interface of said embedded system on a chip;

wherein said embedded graphics controller further includes a third interface to interface with a second input of said embedded display interface, and further wherein said embedded graphics controller is further used to provide said first rendered graphics data to said embedded display interface for display on a second remote display.

12. A system comprising:

a processor to receive a first set and a second set of graphics data;

an output data bus for providing the first set of graphics data to an external graphics controller, said external graphics controller to generate a first rendered graphics data associated with the first set of graphics data provided using the output data bus;

a graphics controller to:
generate a second set of rendered graphics data based on the second set of graphics data; and
provide the second set of rendered graphics data to an external display interface; and a memory controller having a first port coupled to said graphics controller and a second port coupled to system memory, said memory controller to provide said graphics controller access to system.

13. The system as in claim 12, wherein said graphics controller includes a liquid crystal display controller.

14. The system as in claim 12, wherein said external graphics controller provides said first set of rendered graphics data to an integrated display.

15. The system as in claim 14, wherein said integrated display includes a liquid crystal display.

16. The system as in claim 12, wherein said first and second sets of rendered graphics data are associated with an application processed with said processor.

17. The system as in claim 12, wherein said system includes a portable device.

18. The system as in claim 12, wherein said external display interface formats said second set of rendered graphics data for a remote display.

19. The system as in claim 12, wherein said output data bus further used to provide control data associated with display settings of said external display interface.

20. A method comprising:

receiving, at a system on a chip, a first set of graphics data and a second set of graphics data;

providing the first set of graphics data to an external graphics controller, wherein the external graphics controller generates a first set of rendered graphics data associated with the first set of graphics data;

processing, at the system on a chip, the second set of graphics data to generate a second set of rendered graphics data; and providing the second set of rendered graphics data to a display interface.

21. The method as in claim 20, wherein the external graphics controller provides the first set of rendered graphics data to an integrated display.

22. The method as in claim 21, wherein the integrated display includes a liquid crystal display screen.

23. The method as in claim 22, wherein the integrated display includes a thin film transistor screen.

24. The method as in claim 20, wherein the display interface is used to provide the second set of rendered graphics data to a remote display.

25. The method as in claim 24, wherein the remote display includes a video graphics adapter display.

26. The method as in claim 24, wherein the remote display includes a Transition Minimized Differential Signaling display.

27. The method as in claim 24, wherein the remote display includes a Low Voltage Differential Signaling display.

28. The method as in claim 20, wherein the first set of rendered graphics data is different from the second set of rendered graphics data.

29. A method comprising:

in a first mode of operation:
- rendering a first set of graphics data at a graphics controller embedded in a portable device; and
- providing the rendered first set of graphics data to an LCD integrated with the portable device; and in a second mode of operation:
- rendering a second set of graphics data at the graphics controller embedded in the portable device;
- providing the second set of graphics data to the LCD integrated with the portable device; and
- providing a third set of graphics data to a graphics controller external to the portable device for rendering and display at a display external to the portable device.

30. A portable device comprising:

an integrated LCD;

a system on a chip comprising:
- means for rendering a first set of graphics data;
- a first output operably coupled to a display interface, the first output operable to provide the rendered first set of graphics data to the display interface for display on a display device external to the portable device; and
- a second output operable to provide a second set of graphics data;

a video controller comprising:
- an input operably coupled to the second output of the system on a chip to receive the second set of graphics data;
- means for rendering the second set of graphics data; and
- an output operably coupled to the integrated LCD to provide the rendered second set of graphics data for display on the integrated LCD.

* * * * *